US010474802B2

(12) United States Patent
Wendling

(10) Patent No.: US 10,474,802 B2
(45) Date of Patent: Nov. 12, 2019

(54) BIOMETRIC ENROLMENT AUTHORISATION

(71) Applicant: ZWIPE AS, Oslo (NO)

(72) Inventor: Jean-Hugues Wendling, Denver, CO (US)

(73) Assignee: Zwipe AS, Oslo (NO)

(*) Notice: Subject to any disclaimer, the term of this patent is extended or adjusted under 35 U.S.C. 154(b) by 157 days.

(21) Appl. No.: 15/516,949

(22) PCT Filed: Oct. 12, 2015

(86) PCT No.: PCT/EP2015/073537
§ 371 (c)(1),
(2) Date: Apr. 5, 2017

(87) PCT Pub. No.: WO2016/055661
PCT Pub. Date: Apr. 14, 2016

(65) Prior Publication Data
US 2017/0300680 A1 Oct. 19, 2017

Related U.S. Application Data

(60) Provisional application No. 62/062,258, filed on Oct. 10, 2014.

(30) Foreign Application Priority Data

May 14, 2015 (GB) .................................. 1508294.4

(51) Int. Cl.
G06F 21/32 (2013.01)
G06Q 20/32 (2012.01)
(Continued)

(52) U.S. Cl.
CPC .......... *G06F 21/32* (2013.01); *G06K 7/10297* (2013.01); *G06K 9/00013* (2013.01);
(Continued)

(58) Field of Classification Search
CPC ................ G06F 21/32; G06K 7/10297; G06K 2007/10524; G06Q 40/02
(Continued)

(56) References Cited

U.S. PATENT DOCUMENTS 7,278,025 B2 10/2007 Saito et al.
7,481,360 B1* 1/2009 Ramachandran ...... G06Q 20/18
235/379
(Continued)

FOREIGN PATENT DOCUMENTS

EP 1074949 A1 2/2001
EP 2495705 A1 9/2012
(Continued)

*Primary Examiner* — Venkat Perungavoor
*Assistant Examiner* — Peiliang Pan
(74) *Attorney, Agent, or Firm* — Eversheds Sutherland (US) LLP

(57) ABSTRACT

A method of authorizing enrollment of an RFID device including a biometric sensor may include separately sending the RFID device and an authorization code associated with the RFID device to the user. The RFID device is configured such that, when the user presents the RFID device to an RFID terminal and inputs the authorization code to the terminal, the RFID device will enter an enrollment mode during which the user is authorized to enroll their biometric data.

16 Claims, 3 Drawing Sheets

(51) Int. Cl.
  *G06Q 20/34* (2012.01)
  *G06Q 20/40* (2012.01)
  *G06K 9/00* (2006.01)
  *G06K 7/10* (2006.01)
  *G06Q 40/02* (2012.01)

(52) U.S. Cl.
  CPC ..... *G06Q 20/3278* (2013.01); *G06Q 20/3552* (2013.01); *G06Q 20/40145* (2013.01); *G06K 2007/10524* (2013.01); *G06Q 40/02* (2013.01)

(58) Field of Classification Search
  USPC .......................................................... 726/18
  See application file for complete search history.

(56) References Cited

U.S. PATENT DOCUMENTS

| | | | |
|---|---|---|---|
| 7,492,258 B1* | 2/2009 | Shoarinejad | G06Q 20/409 340/572.1 |
| 2003/0173408 A1* | 9/2003 | Mosher, Jr. | A61B 5/117 235/492 |
| 2004/0230488 A1 | 11/2004 | Beenau et al. | |
| 2005/0207624 A1 | 9/2005 | Ejlers et al. | |
| 2006/0161789 A1* | 7/2006 | Doughty | G06Q 20/327 713/186 |
| 2006/0170530 A1 | 8/2006 | Nwosu et al. | |
| 2006/0206724 A1* | 9/2006 | Schaufele | G06F 21/32 713/186 |
| 2007/0094512 A1 | 4/2007 | Nomiya | |
| 2008/0014867 A1* | 1/2008 | Finn | G06K 7/0008 455/41.1 |
| 2008/0086645 A1* | 4/2008 | Uchiyama | G06F 21/32 713/184 |
| 2008/0105751 A1* | 5/2008 | Landau | A63F 13/10 235/492 |
| 2009/0215385 A1* | 8/2009 | Waters | H04L 63/0853 455/1 |
| 2010/0039234 A1* | 2/2010 | Soliven | H04B 5/02 340/10.1 |
| 2010/0250944 A1* | 9/2010 | Suzuki | G06F 21/32 713/172 |
| 2013/0207786 A1 | 8/2013 | Hutzler et al. | |
| 2013/0232082 A1* | 9/2013 | Krawczewicz | G06F 19/324 705/55 |
| 2013/0335193 A1* | 12/2013 | Hanson | H04W 12/06 340/5.61 |

FOREIGN PATENT DOCUMENTS

| | | |
|---|---|---|
| JP | 2009-009434 A | 1/2009 |
| JP | 2011-118852 A | 6/2011 |
| WO | 3015490 A1 | 12/1990 |
| WO | 2012125655 A1 | 9/2012 |

* cited by examiner

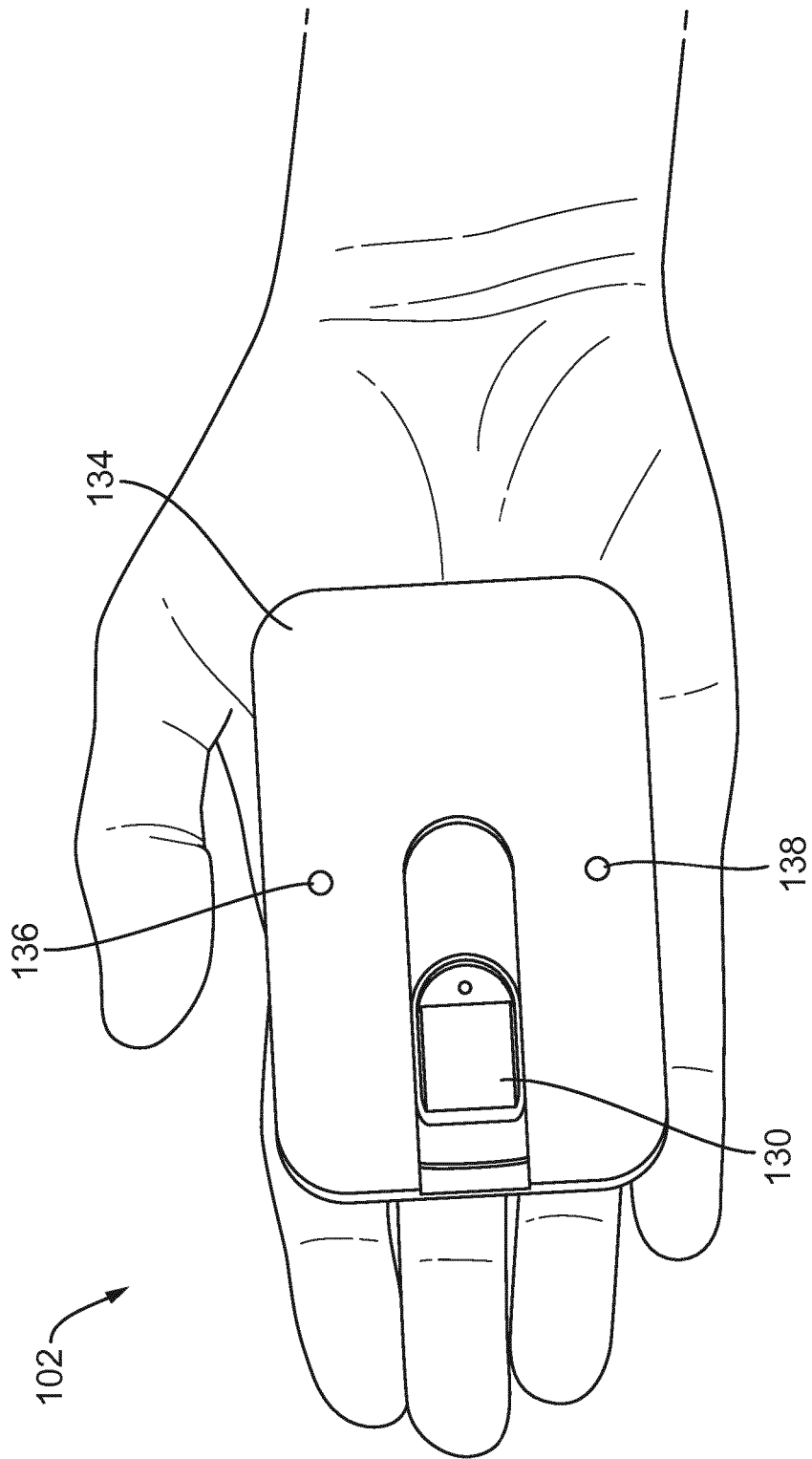

BIOMETRIC ENROLMENT AUTHORISATION

TECHNICAL FIELD

The present invention relates to a method of ensuring that only an authorised recipient of a biometric RFID device is able to enroll their biometric data onto the device.

BACKGROUND OF THE INVENTION

FIG. 1 shows the architecture of a typical passive RFID device 2. A powered RFID reader 4 transmits a signal via an antenna 6. The signal is typically 13.56 MHz for MIFARE® and DESFire® systems, manufactured by NXP Semiconductors, but may be 125 kHz for lower frequency PROX® products, manufactured by HID Global Corp. This signal is received by an antenna 8 of the RFID device 2, comprising a tuned coil and capacitor, and then passed to an RFID chip 10. The received signal is rectified by a bridge rectifier 12, and the DC output of the rectifier 12 is provided to a control circuit 14 that controls the messaging from the chip 10.

Data output from the control circuit 14 is connected to a field effect transistor 16 that is connected across the antenna 8. By switching on and off the transistor 16, a signal can be transmitted by the RFID device 2 and decoded by suitable control circuits 18 in the reader 4. This type of signalling is known as backscatter modulation and is characterised by the fact that the reader 4 is used to power the return message to itself.

As an additional security measure, some RFID devices have been adapted to additionally process biometric identification data to provide improved security. In such systems, the user is provided with an RFID card having a biometric template stored on it. A terminal, for example to enable the owner of the card to gain access to money or physical access to a building or office, is provided with a fingerprint sensor and, to authorise the user, a fingerprint read from the terminal is transmitted from the terminal to the RFID card, where a match is performed with the stored template on the card. The RFID card then wirelessly communicates to the terminal the results of the live matching, yes or no.

SUMMARY OF THE INVENTION

It is herein proposed to incorporate a biometric sensor, such a fingerprint scanner, into a passive RFID device. At least the preferred embodiments of the present invention seek to solve some of the technical problems associated with such a device.

Viewed from a first aspect, the present invention provides a method comprising: sending an RFID device including a biometric sensor to a user, the RFID device having a biometric authentication engine including a memory and a biometric scanner; and sending an authorisation code associated with the RFID device to the user, wherein the authorisation code is sent separately from the RFID device; wherein the RFID device is configured such that, responsive to the user presenting the RFID device to an RFID terminal and inputting the authorisation code to the terminal, the RFID device will enter an enrollment mode during which the user is authorised to enroll their biometric data to the memory using the biometric scanner.

It is important to ensure that only the authorised recipient of an RFID device is able to enroll their biometric data to the device. This is because the enrolled biometric data can be used to substitute other identification means, such as a personal identification number (PIN). However, it is desirable that the RFID device can be sent, for example, by mail to the user for convenience. The authorisation code may similarly be sent by mail, but could alternatively be set electronically, for example.

With chip-and-pin cards, a level of security is achieved by sending the card and the PIN separately, so as to minimise the chance of both being intercepted, which would thus allow an unauthorised user to use the card. The present invention utilises a similar technique to ensure that only the authorised user is able to enroll their biometric data onto the RFID device.

Preferably, after enrollment of the biometric data, the RFID device is configured to verify the identity of the user responsive either to inputting of the authorisation code or to scanning of biometric data matching the enrolled biometric data.

Thus, once the correct data is enrolled, the biometric data can be used as an alternative form of identity verification for the user to, for example, access a bank account or to physically access a location.

In another possible arrangement, the RFID device may be configured to rely solely on biometric authorisation for some or all instances of use of the device after enrollment is completed. The RFID device may require biometric authorisation periodically, for example after every five uses of the authorisation code, in order to confirm that the device is still in the control of the originally enrolled user and that the authorisation code has not been stolen or lost. The RFID device may require biometric authorisation for all further uses. In this latter case the authorisation code is valid for a single use to start the enrollment process. After that point the identity of the user must be confirmed using the biometric data. This can provide a higher level of security.

Preferably, the biometric data cannot be changed after enrollment. In this case, it is particularly important that only the intended recipient can enroll their data, as it cannot be changed afterwards.

In one embodiment, the biometric authentication engine is a fingerprint authentication engine. The biometric sensor may then be a fingerprint sensor. Fingerprints provide readily accessible biometric verification that is almost unique to a particular user.

Viewed from a second aspect, the present invention also provides an RFID device comprising a biometric authentication engine including a memory, a processor and a biometric scanner, wherein the processor is configured such that, responsive to a user of the RFID device presenting the RFID device to an RFID terminal and inputting the authorisation code to the terminal, the RFID device will enter an enrollment mode during which the user is authorised to enroll their biometric data to the memory using the biometric scanner.

Preferably the memory is suitable for storage of biometric data to verify the identity of the user. Initially, for example at the point of mailing to a user, the memory does not contain biometric data. Preferably, the biometric data on the memory cannot be changed after enrollment onto the memory.

The RFID device is preferably suitable for use with, and/or arranged to be used with, the method, and optionally any of the preferred steps of the method, described above.

Preferably, after enrollment of the biometric data, the RFID device is configured to verify the identity of the user responsive either to inputting of the authorisation code or to scanning of biometric data matching the enrolled biometric data.

The RFID device may be configured to rely solely on biometric authorisation for some or all instances of use of the device after enrollment is completed. The RFID device may require biometric authorisation periodically, for example after every five uses of the authorisation code, in order to confirm that the device is still in the control of the originally enrolled user and that the authorisation code has not been stolen or lost. The RFID device may require biometric authorisation for all further uses. In this latter case the authorisation code is valid for a single use to start the enrollment process. After that point the identity of the user must be confirmed using the biometric data. This can provide a higher level of security.

Preferably, the biometric data cannot be changed after enrollment. In this case, it is particularly important that only the intended recipient can enroll their data, as it cannot be changed afterwards.

In one embodiment, the biometric authentication engine is a fingerprint authentication engine. The biometric sensor may then be a fingerprint sensor. Fingerprints provide readily accessible biometric verification that is almost unique to a particular user.

Furthermore, the RFID device in the method of the first aspect or the RFID device of the second aspect may optionally include any or all of the following features.

The RFID device may be a passive RFID device comprising: an antenna for harvesting energy from an RF excitation field, the antenna being arranged such that the biometric authentication engine is powered by the energy harvested by the antenna, wherein the biometric authentication engine is capable of performing an enrollment process in which data representing a fingerprint of a finger presented to the biometric scanner is stored in the memory; and wherein the biometric authentication engine is capable of performing a matching process in which a fingerprint of a finger presented to the biometric scanner is compared with fingerprint data stored in the memory.

In accordance with the proposed device, both the matching and enrollment scans may be performed using the same biometric sensor and within the same RFID device. As a result, scanning errors can be balanced out because, if a user tends to present their finger with a lateral bias during enrollment, then they are likely to do so also during matching. Thus, the use of the onboard biometric sensor for all scans used with the RFID device significantly reduces errors in the enrollment and matching, and hence produces more reproducible results.

Furthermore, by performing all processing in the fingerprint authentication engine, security can be improved because the fingerprint data of the user need not be made available to another device (as is the case with separate enrollment). Indeed, the use of an onboard biometric sensor is further particularly compatible with the method of the first aspect, whereby the card is mailed to the user, as they are able to enroll their biometric data onto the card without the use of additional hardware, such as a specific enrollment terminal.

Preferably the RFID device is configured such that the fingerprint data cannot be transmitted from the RFID device. In a preferred embodiment, the biometric scanner is an area-type fingerprint scanner.

In one preferred aspect, the passive RFID device comprises an RFID device controller arranged to perform a method comprising: receiving, by the antenna, a command from a powered RFID reader; receiving, by the antenna, a substantially continuous radio-frequency excitation field whilst the RFID reader waits for a response to the command; performing a process in the biometric authentication engine, the process being one not required for responding to the command from the RFID reader; determining a period that the RFID device has been waiting for a response; and responsive to determining that the period exceeds a predetermined threshold if the process has not been completed, sending by the antenna a request for a wait time extension to the RFID reader.

The above method performed by the RFID device controller takes advantage of certain aspect of the standard functionality of a RFID reader complying with, for example, international standard ISO/IEC 14443. Particularly, whilst the RFID reader waits for a response to a command, it must maintain a non-pulsing, preferably a substantially continuous, radio frequency (RF) excitation field.

Thus, in accordance with this method, when the RFID reader sends a command to the RFID device, the device does not respond, but rather waits and harvests the power to drive the functionality of the biometric authentication engine.

The process performed by the fingerprint authentication engine is preferably one not required for responding to the command, for example the command may be a "request to provide identification code" command. That is to say, a response to the command from the RFID device is intentionally delayed so as to allow the processing to be performed.

The process performed by the biometric authentication engine may be one of a biometric enrollment process or a biometric matching process. This method is particularly applicable to biometric matching or enrollment, for example fingerprint matching or enrollment processes, as these processes require input from the user (i.e. one or more biometric scans), which can only be processed at the rate that they are supplied by the user of the RFID device.

In the preferred embodiments, the RFID device does not respond to the command whilst the biometric authentication engine is performing the process. Furthermore, the method preferably further comprises: after the biometric authentication engine completes the process, responding by the RFID device to the command.

The steps of "determining a period that the RFID device has been waiting for a response; and responsive to determining that the period exceeds a predetermined threshold if the process has not been completed, sending by the RFID device a request for a wait time extension to the RFID reader" are preferably repeated until the process is completed and/or a response to the command has been sent. For example, after the process has been completed, the RFID device may allow the wait time to expire, if no further communication with the RFID reader is required. Alternatively, a response to the RFID reader may be sent, for example if the process was part of an authorisation step before responding to the command.

Preferably, the period is a time since the command was received or since the last wait time extension request was made. Thus, the request for a wait time extension can be sent before expiry of the current wait time to ensure that the RFID reader continues to maintain the RF excitation field until the process is complete.

Without using a request for a wait time extension, the maximum default time that a non-pulsing RF excitation field could be supplied is 4.949 seconds for an RFID reader complying with international standard ISO/IEC 14443. Thus, the method performed by the RFID device controller is particularly applicable to fingerprint matching and enrollment, as these processes require input from the user (i.e. one or more fingerprint scans), which can only be processed at the rate that they are supplied by the user of the RFID device. The method particularly allows these processes to be performed by the fingerprint authentication engine when the process requires greater than 5.0 seconds to be completed.

As discussed above, the method is particularly applicable to devices and readers complying with international standard ISO/IEC 14443 (although the method may be applicable also to other standards operating in a similar manner), and thus the RFID device is preferably a proximity integrated circuit card (PICC) and the RFID reader is preferably a proximity coupling device (PCD). The PICC and PCD preferably comply with the definitions set forth in the international standard ISO/IEC 14443. The predetermined threshold is preferably below a pre-arranged first wait time of the PICC and the PCD.

The RFID device may be any one of: an access card, a credit card, a debit card, a pre-pay card, a loyalty card, an identity card, a cryptographic card, or the like.

BRIEF DESCRIPTION OF THE DRAWINGS

Certain preferred embodiments of the present invention will now be described in greater detail, by way of example only and with reference to the accompanying Figures, in which:

FIG. 3 illustrates an external housing for the passive RFID device incorporating the fingerprint scanner.

DETAILED DESCRIPTION OF THE INVENTION

Figure 1:
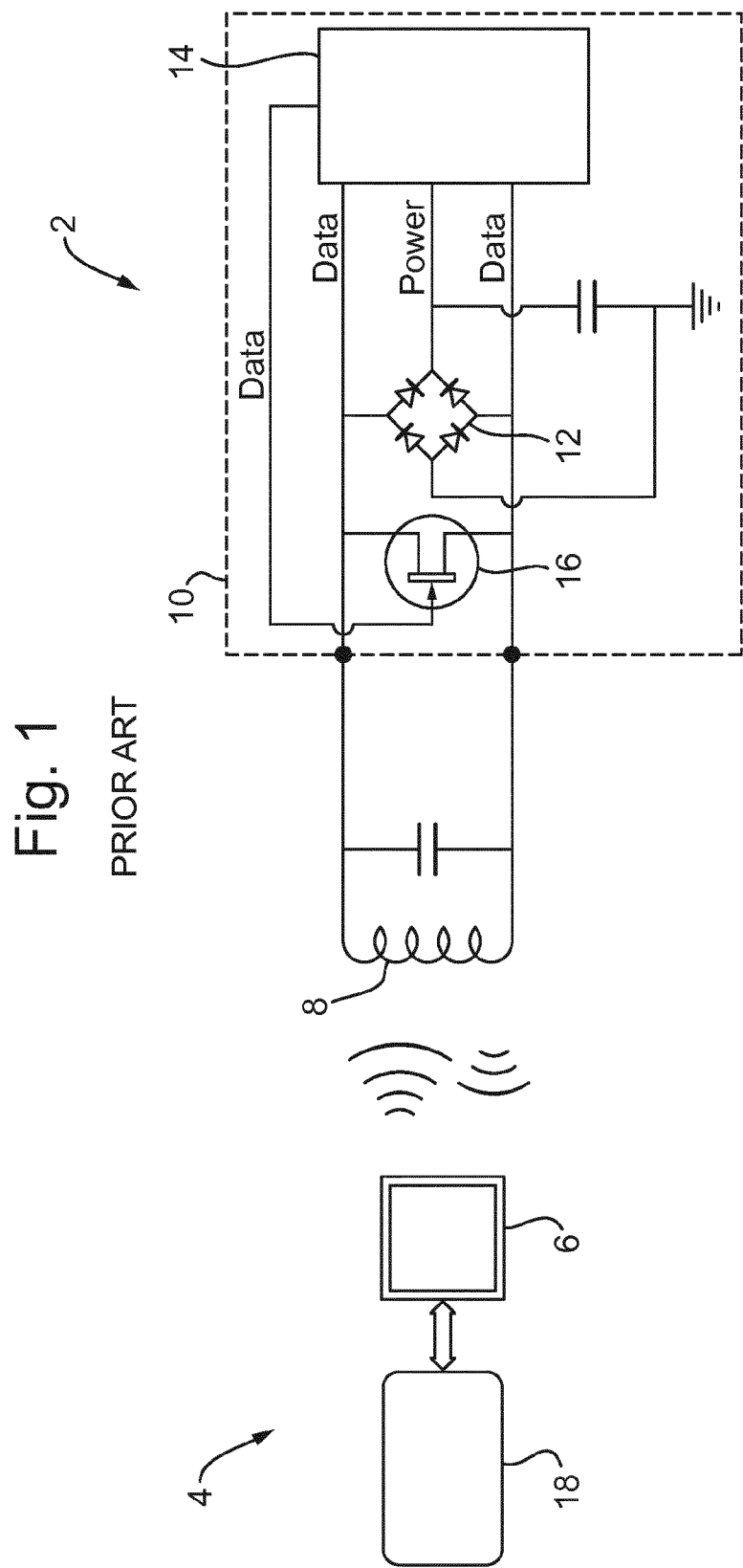
FIG. 1 illustrates a circuit for a prior art passive RFID device.
Figure 2:
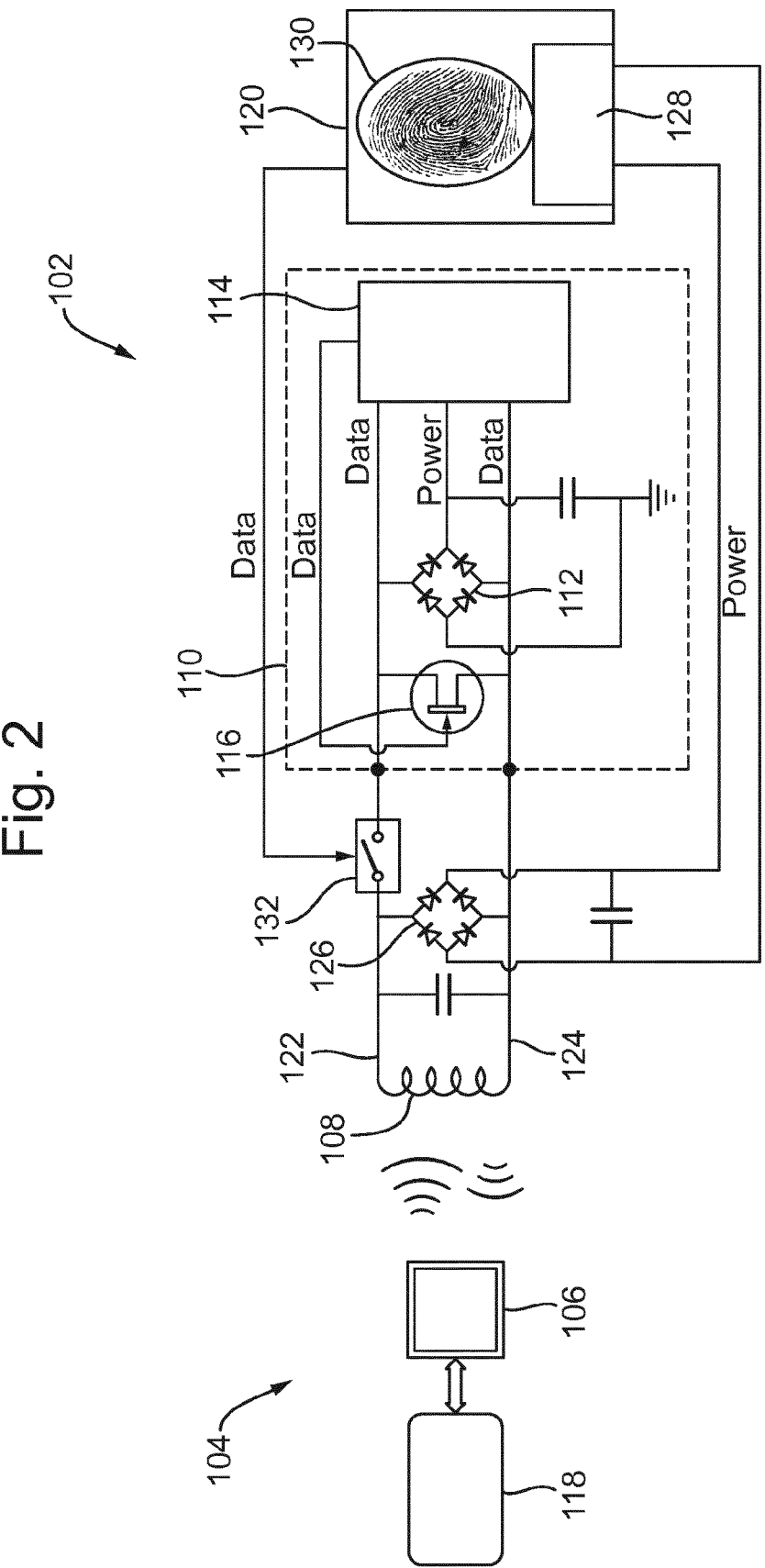
FIG. 2 illustrates a circuit for a passive RFID device incorporating a fingerprint scanner.

FIG. 2 shows the architecture of an RFID reader 104 and a passive RFID device 102, which is a variation of the prior art passive RFID device 2 shown in FIG. 1. The RFID device 102 shown in FIG. 2 has been adapted to include a fingerprint authentication engine 120.

The RFID reader 104 is a conventional RFID reader and is configured to generate an RF excitation field using a reader antenna 106. The reader antenna 106 further receives incoming RF signals from the RFID device 102, which are decoded by control circuits 118 within the RFID reader 104.

The RFID device 102 comprises an antenna 108 for receiving an RF (radio-frequency) signal, a passive RFID chip 110 powered by the antenna, and a passive fingerprint authentication engine 120 powered by the antenna 108.

As used herein, the term "passive RFID device" should be understood to mean an RFID device 102 in which the RFID chip 110 is powered only by energy harvested from an RF excitation field, for example generated by the RFID reader 118. That is to say, a passive RFID device 102 relies on the RFID reader 118 to supply its power for broadcasting. A passive RFID device 102 would not normally include a battery, although a battery may be included to power auxiliary components of the circuit (but not to broadcast); such devices are often referred to as "semi-passive RFID devices".

Similarly, the term "passive fingerprint/biometric authentication engine" should be understood to mean a fingerprint/biometric authentication engine that is powered only by energy harvested from an RF excitation field, for example an RF excitation field generated by the RFID reader 118.

The antenna comprises a tuned circuit, in this arrangement including an induction coil and a capacitor, tuned to receive an RF signal from the RFID reader 104. When exposed to the excitation field generated by the RFID reader 104, a voltage is induced across the antenna 108.

The antenna 108 has first and second end output lines 122, 124, one at each end of the antenna 108. The output lines of the antenna 108 are connected to the fingerprint authentication engine 120 to provide power to the fingerprint authentication engine 120. In this arrangement, a rectifier 126 is provided to rectify the AC voltage received by the antenna 108. The rectified DC voltage is smoothed using a smoothing capacitor and supplied to the fingerprint authentication engine 120.

The fingerprint authentication engine 120 includes a processing unit 128 and a fingerprint reader 130, which is preferably an area fingerprint reader 130 as shown in FIG. 3. The fingerprint authentication engine 120 is passive, and hence is powered only by the voltage output from the antenna 108. The processing unit 128 comprises a microprocessor that is chosen to be of very low power and very high speed, so as to be able to perform biometric matching in a reasonable time.

The fingerprint authentication engine 120 is arranged to scan a finger or thumb presented to the fingerprint reader 130 and to compare the scanned fingerprint of the finger or thumb to pre-stored fingerprint data using the processing unit 128. A determination is then made as to whether the scanned fingerprint matches the pre-stored fingerprint data. In a preferred embodiment, the time required for capturing a fingerprint image and accurately recognising an enrolled finger is less than one second.

If a match is determined, then the RFID chip 110 is authorised to transmit a signal to the RFID reader 104. In the FIG. 2 arrangement, this is achieved by closing a switch 132 to connect the RFID chip 110 to the antenna 108. The RFID chip 110 is conventional and operates in the same manner as the RFID chip 10 shown in FIG. 1 to broadcast a signal via the antenna 108 using backscatter modulation by switch on and off a transistor 116.

FIG. 3 shows an exemplary housing 134 of the RFID device 102. The circuit shown in FIG. 2 is housed within the housing 134 such that a scanning area of the fingerprint reader 130 is exposed from the housing 134.

Prior to use the user of the RFID device 102 must first enroll his fingerprint date onto a "virgin" device, i.e. not including any pre-stored biometric data. This may be done by presenting his finger to the fingerprint reader 130 one or more times, preferably at least three times and usually five to seven times. An exemplary method of enrollment for a fingerprint using a low-power swipe-type sensor is disclosed in WO 2014/068090 A1, which those skilled in the art will be able to adapt to the area fingerprint sensor 130 described herein.

The housing may include indicators for communication with the user of the RFID device, such as the LEDs 136, 138 shown in FIG. 3. During enrollment, the user may be guided by the indicators 136, 138, which tell the user if the fingerprint has been enrolled correctly. The LEDs 136, 138 on the RFID device 102 may communicate with the user by transmitting a sequence of flashes consistent with instructions that the user he has received with the RFID device 102.

After several presentations, the fingerprint will have been enrolled and the device 102 may be forever responsive only to its original user.

With fingerprint biometrics, one common problem has been that it is difficult to obtain repeatable results when the initial enrollment takes place in one place, such as a dedicated enrollment terminal, and the subsequent enrollment for matching takes place in another, such as the terminal where the matching is required. The mechanical features of the housing around each fingerprint sensor must be carefully designed to guide the finger in a consistent manner each time it is read. If a fingerprint is scanned with a number of different terminals, each one being slightly different, then errors can occur in the reading of the fingerprint. Conversely, if the same fingerprint sensor is used every time then the likelihood of such errors occurring is reduced.

As described above, the present device 102 includes a fingerprint authentication engine 120 having an onboard fingerprint sensor 130 as well as the capability of enrolling the user, and thus both the matching and enrollment scans may be performed using the same fingerprint sensor 130. As a result, scanning errors can be balanced out because, if a user tends to present their finger with a lateral bias during enrollment, then they are likely to do so also during matching.

Thus, the use of the same fingerprint sensor 130 for all scans used with the RFID device 102 significantly reduces errors in the enrollment and matching, and hence produces more reproducible results.

In the present arrangement, the power for the RFID chip 110 and the fingerprint authentication engine 120 is harvested from the excitation field generated by the RFID reader 104. That is to say, the RFID device 102 is a passive RFID device, and thus has no battery, but instead uses power harvested from the reader 104 in a similar way to a basic RFID device 2.

The rectified output from second bridge rectifier 126 is used to power the fingerprint authentication engine 120. However, the power required for this is relatively high compared to the power demand for the components of a normal RFID device 2. For this reason, is has not previously been possible to incorporate a fingerprint reader 130 into a passive RFID device 102. Special design considerations are used in the present arrangement to power the fingerprint reader 130 using power harvested from the excitation field of the RFID reader 104.

One problem that arises when seeking to power the fingerprint authentication engine 120 is that typical RFID readers 104 pulse their excitation signal on and off so as to conserve energy, rather than steadily emitting the excitation signal. Often this pulsing results in a duty cycle of useful energy of less than 10% of the power emitted by steady emission. This is insufficient to power the fingerprint authentication engine 120.

RFID readers 104 may conform to ISO/IEC 14443, the international standard that defines proximity cards used for identification, and the transmission protocols for communicating with them. When communicating with such RFID devices 104, the RFID device 102 can take advantage of a certain feature of these protocols, which will be described below, to switch the excitation signal from the RFID reader 104 to continuous for long enough to perform the necessary calculations.

The ISO/IEC 14443-4 standard defines the transmission protocol for proximity cards. ISO/IEC 14443-4 dictates an initial exchange of information between a proximity integrated circuit card (PICC), i.e. the RFID device 102, and a proximity coupling device (PCD), i.e. the RFID reader 104, that is used, in part, to negotiate a frame wait time (FWT). The FWT defines the maximum time for PICC to start its response after the end of a PCD transmission frame. The PICC can be set at the factory to request an FWT ranging from 302 μs to 4.949 seconds.

ISO/IEC14443-4 dictates that, when the PCD sends a command to the PICC, such as a request for the PICC to provide an identification code, the PCD must maintain an RF field and wait for at least one FWT time period for a response from the PICC before it decides a response timeout has occurred. If the PICC needs more time than FWT to process the command received from the PCD, then the PICC can send a request for a wait time extension (S(WTX)) to the PCD, which results in the FWT timer being reset back to its full negotiated value. The PCD is then required to wait another full FWT time period before declaring a timeout condition.

If a further wait time extension (S(WTX)) is sent to the PCD before expiry of the reset FWT, then the FWT timer is again reset back to its full negotiated value and the PCD is required to wait another full FWT time period before declaring a timeout condition.

This method of sending requests for a wait time extension can be used to keep the RF field on for an indefinite period of time. While this state is maintained, communication progress between the PCD and the PICC is halted and the RF field can be used to harvest power to drive other processes that are not typically associated with smart card communication, such as fingerprint enrollment or verification.

Thus, with some carefully designed messaging between the card and the reader enough power can be extracted from the reader to enable authentication cycle. This method harvesting of power overcomes one of the major problem of powering a passive fingerprint authentication engine 120 in a passive RFID device 102, particularly for when a fingerprint is to be enrolled.

Furthermore, this power harvesting method allows a larger fingerprint scanner 130 to be used, and particularly an area fingerprint scanner 130, which outputs data that is computationally less intensive to process.

As discussed above, prior to use of the RFID device 102, the user of the device 102 must first enroll themselves on the "virgin" device 102. After enrollment, the RFID device 102 will then be responsive to only this user. Accordingly, it is important that only the intended user is able to enroll their fingerprint on the RFID device 102.

A typical security measure for a person receiving a new credit or chip card via the mail is to send the card through one mailing and a PIN associated with the card by another. However for a biometrically-authenticated RFID device 102, such as that described above, this process is more complicated. An exemplary method of ensuring only the intended recipient of the RFID device 102 is able to enroll their fingerprint is described below.

As above, the RFID device 102 and a unique PIN associated with the RFID device 102 are sent separately to the user. However, the user cannot use the biometric authentication functionality of the RFID card 102 until he has enrolled his fingerprint onto the RFID device 102.

The user is instructed to go to a point of sale terminal which is equipped to be able to read cards contactlessly and to present his RFID device 102 to the terminal. At the same time, he enters his PIN into the terminal through its keypad.

The terminal will send the entered PIN to the RFID device 102. As the user's fingerprint has not yet been enrolled to the RFID device 102, the RFID device 102 will compare the keypad entry to the PIN of the RFID device 102. If the two are the same, then the card becomes enrollable.

The card user may then enroll his fingerprint using the method described above. Alternatively, if the user has a suitable power source available at home, he may take the RFID device 102 home and go through a biometric enrollment procedure at a later time.

The RFID device 102, once enrolled may then be used contactlessly using a fingerprint, with no PIN, or with only the PIN depending on the amount of the transaction taking place. As noted above the RFID device may be set up to require periodic confirmation of the user's identity via biometrics, or in some cases, for additional security, it may respond only to biometric authentication after the biometric data has been enrolled.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A method comprising:
    sending an RFID device to a user, the RFID device having a biometric authentication engine including a memory and a biometric sensor; and
    sending an authorisation code associated with the RFID device to the user, wherein the authorisation code is sent separately from the RFID device;
    wherein the RFID device is configured such that, responsive to the user presenting the RFID device to an RFID terminal and inputting the authorisation code to the terminal, the RFID device will enter an enrollment mode during which the user is authorised to enroll their biometric data to the memory using the biometric sensor.

2. A method according to claim 1, wherein the RFID device is configured, after enrollment of the biometric data, to verify the identity of the user responsive either to inputting of the authorisation code or to scanning of biometric data matching the enrolled biometric data.

3. A method according to claim 1, wherein the biometric data cannot be changed after enrollment.

4. A method according to claim 1, wherein the biometric authentication engine is a fingerprint authentication engine and the biometric sensor is a fingerprint sensor.

5. A method according to claim 1, wherein the RFID device is a proximity integrated circuit card compliant with ISO/IEC 14443.

6. An RFID device comprising a biometric authentication engine including a memory, a processor and a biometric sensor, wherein the processor is configured such that, responsive to a user of the RFID device presenting the RFID device to an RFID terminal and inputting an authorisation code to the terminal, the RFID device will enter an enrollment mode during which the user is authorised to enroll their biometric data to the memory using the biometric sensor.

7. An RFID device according to claim 6, wherein the memory is for storage of biometric data to verify the identity of the user, and wherein the memory does not initially contain biometric data.

8. An RFID device according to claim 6, wherein the RFID device is configured, after enrollment of the biometric data, to verify the identity of the user responsive either to of inputting of the authorisation code or to scanning of biometric data matching the enrolled biometric data.

9. An RFID device according to claim 6, wherein the biometric data cannot be changed after enrollment.

10. An RFID device according to claim 6, wherein the biometric authentication engine is a fingerprint authentication engine and the biometric sensor is a fingerprint sensor.

11. A method according to claim 6, wherein the RFID device is a proximity integrated circuit card compliant with ISO/IEC 14443.

12. A method comprising:
    sending a device to a user, the device having a biometric authentication engine including a memory and the biometric sensor; and
    sending an authorisation code associated with the device to the user, wherein the authorisation code is sent separately from the device;
    wherein the device is configured such that, responsive to receiving and verifying the authorisation code, the device will enter an enrollment mode during which the user is authorised to enroll their biometric data to the memory using the biometric sensor.

13. A method according to claim 12, wherein the device is configured, after enrollment of the biometric data, to verify the identity of the user responsive either to inputting of the authorisation code or to scanning of biometric data matching the enrolled biometric data.

14. A method according to claim 12, wherein the biometric data cannot be changed after enrollment.

15. A method according to claim 12, wherein the biometric authentication engine is a fingerprint authentication engine and the biometric sensor is a fingerprint sensor.

16. A method according to claim 12, wherein the device is a proximity integrated circuit card compliant with ISO/IEC 14443.

* * * * *